United States Patent [19]
Chiappe et al.

[11] Patent Number: 5,601,394
[45] Date of Patent: Feb. 11, 1997

[54] WORKLOAD REGULATOR FOR AUTOMATED PRODUCTION

[75] Inventors: Wayne T. Chiappe, Hinsdale, Ill.; Randy W. Gasquoine, Stockton, Calif.

[73] Assignee: Sardee Industries, Inc., Oak Brook, Ill.

[21] Appl. No.: 902,388

[22] Filed: Jun. 23, 1992

Related U.S. Application Data

[63] Continuation of Ser. No. 638,679, Jan. 8, 1991, Pat. No. 5,123,796, which is a continuation of Ser. No. 287,479, Dec. 20, 1988, Pat. No. 4,983,095, which is a division of Ser. No. 906,063, Sep. 11, 1986, Pat. No. 4,808,057.

[51] Int. Cl.$^6$ ............................................. B65G 1/02
[52] U.S. Cl. ............................................. 414/786
[58] Field of Search .................. 414/266, 267, 414/403, 417, 798.9, 416, 286, 222, 225, 927, 746.8, 226, 125, 795.3, 798.3, 126, 911, 786, 626, 273, 618, 751, 752, 753, 331, 745.7, 22.62, 799, 795.2; 198/344, 347; 364/478

[56] References Cited

U.S. PATENT DOCUMENTS

| | | | |
|---|---|---|---|
| 4,085,759 | 4/1978 | Seragnoli | 198/347.3 X |
| 4,099,637 | 7/1978 | Molins | 414/417 X |
| 4,568,231 | 2/1986 | Czajka et al. | 414/799 X |

FOREIGN PATENT DOCUMENTS

| | | | |
|---|---|---|---|
| 2024758 | 1/1980 | United Kingdom | 198/347.3 |
| 2132969 | 7/1984 | United Kingdom | 198/347.3 |

*Primary Examiner*—Frank E. Werner
*Attorney, Agent, or Firm*—James T. Fitzgibbon

[57] ABSTRACT

A method of controlling the flow of articles between upstream and downstream work stations which respectively produce and modify such articles so that both work stations can operate at the same rates or at different rates.

A continuous flow of articles is received on various inbound tracks, and the continuous flow of articles is subdivided into individual arrays or groups of articles. In those instances wherein the down stream use rate is approximately or exactly equal to the upstream output rate, the groups of articles are transferred from inbound lanes or tracks directly to outbound lanes or tracks. In the cases wherein the supply rate or the demand rate, i.e., the upstream or downstream machine rates are different, then groups of articles are periodically taken from inbound lanes and placed in transient storage or are taken from transient storage and placed in outbound lanes. The method includes moving transient storage receptacles, such as trays, to appropriately indexed positions so as to be aligned with the transfer head which picks up and deposits groups of articles. Also, the method includes adding or withdrawing trays, as needed, from magazines which hold full and empty trays, respectively.

2 Claims, 8 Drawing Sheets

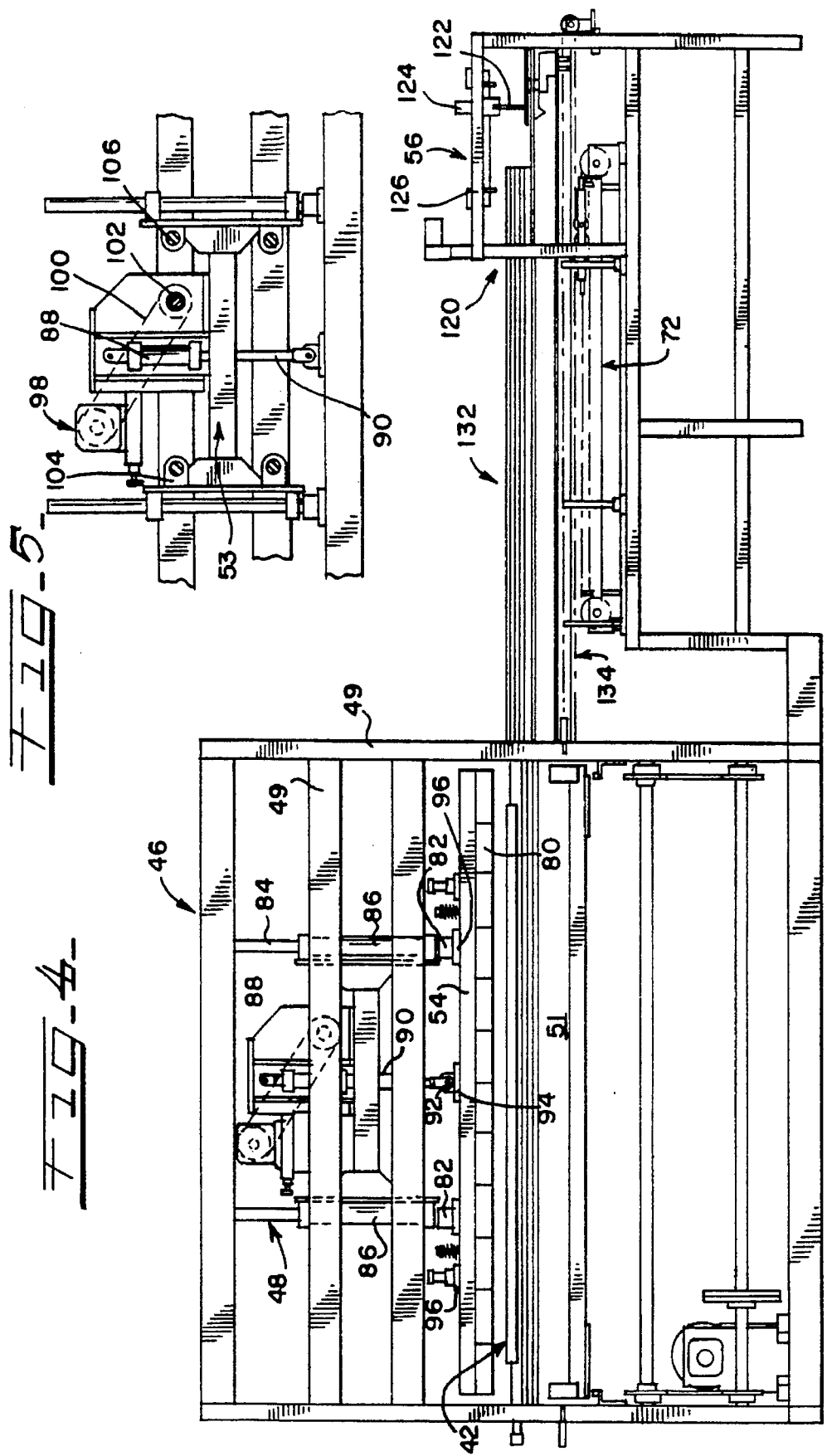

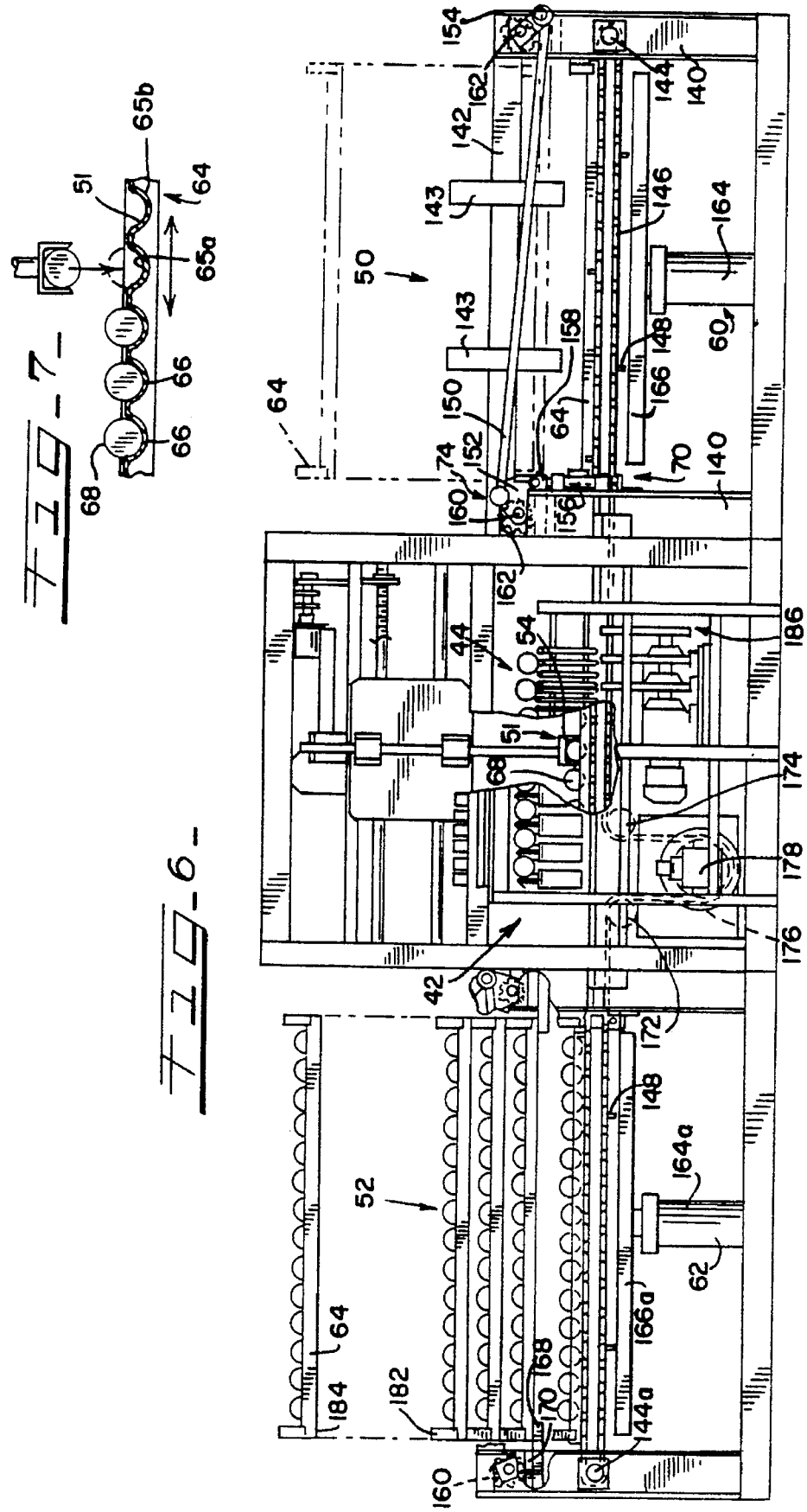

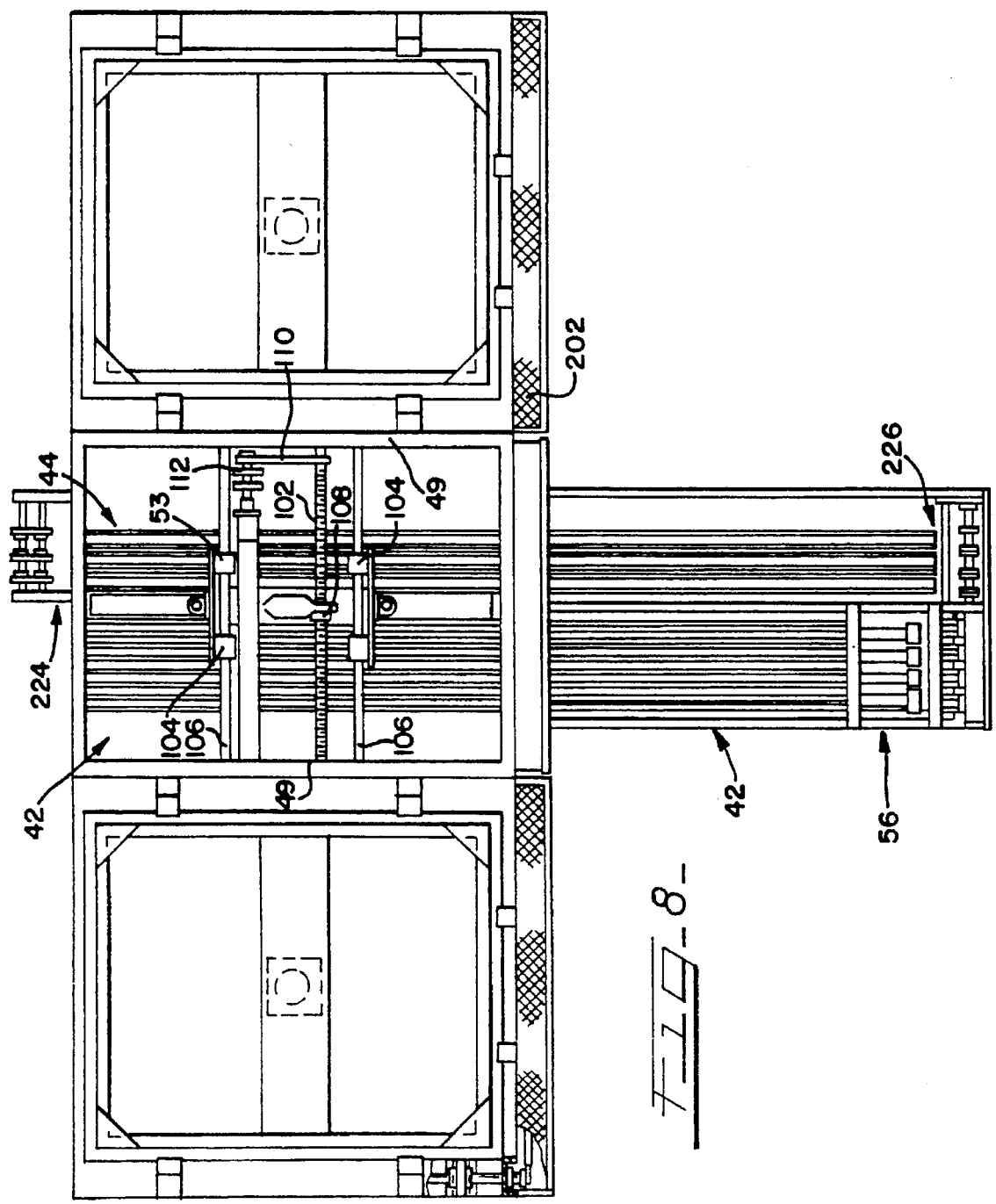
FIG-8-

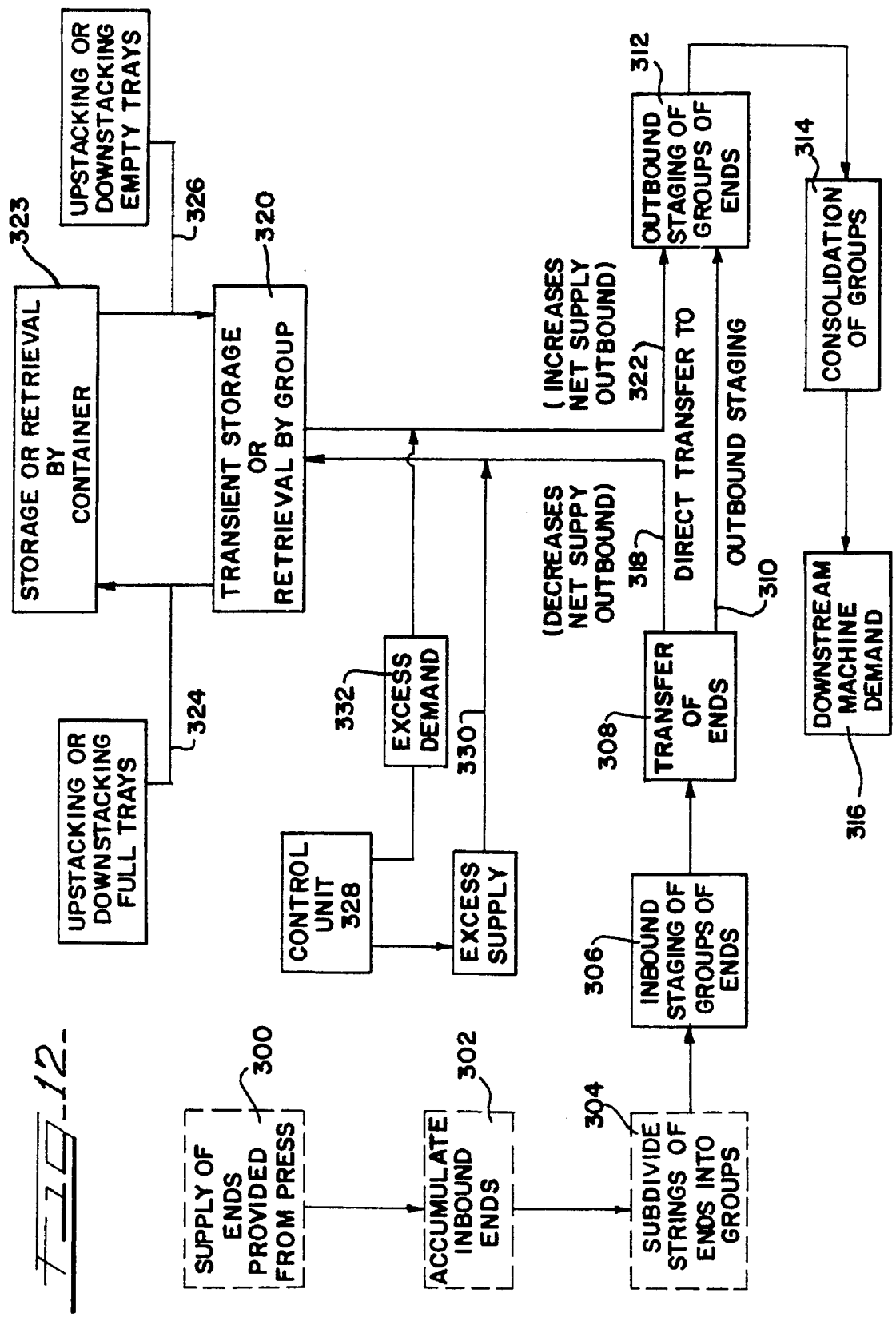

5,601,394

WORKLOAD REGULATOR FOR AUTOMATED PRODUCTION

This Application is a continuation of application Ser. No. 638,679, filed on Jan. 8, 1991 entitled WORKLOAD REGULATOR FOR AUTOMATED PRODUCTION, now U.S. Pat. No. 5,123,796, granted Jun. 23, 1992, which is a continuation of Ser. No. 287,479, filed on Dec. 20, 1988, now U.S. Pat. NO. 4,983,095, granted Jan. 8, 1991, which is in turn a divisional application of U.S. Ser. No. 906,063, filed Sep. 11, 1986, now U.S. Pat. No. 4,808,057, granted Feb. 28, 1989.

BACKGROUND OF THE INVENTION

The present invention relates generally to improved apparatus for mass production manufacturing, and in a presently preferred form, to an apparatus for dynamically regulating input and output workloads to achieve efficient operations.

In one form, an apparatus made according to the invention receives continuous input of separate articles such as can ends in long "strings", and subdivides them into individual arrays or "sticks", in which form the ends or like articles are handled so as to insure that the output of one or more manufacturing machines may be accommodated by one or more additional processing machines located downline or downstream thereof, while permitting all such machines to operate either continuously or intermittently without loss of production.

The preferred form of apparatus includes means for transiently storing excess sticks of can ends, for example, in containers such as open top trays which are filled stick by stick with the can endst the trays may also be previously filled and act as the source of the main supply, or an extra or supplementary supply of ends which are in turn fed to machines downstream of the apparatus. Thus, the sticks of ends may be sent directly downstream or stored transiently, and the outbound end supply may be supplemented from time to time by sticks of ends taken from storage.

Referring to the preferred form of apparatus, this unit consists of what may be referred to as a load regulator and includes a magazine for storing a series of empty trays, a magazine for storing a series of full trays, a transfer assembly for picking up sticks of can ends and sequentially loading them into predetermined areas of empty storage trays to fill the trays, or, in the alternative, to unload full trays of ends, stick by stick. All such operations are done under automated control to insure that temporary dislocations and transient changes of machine output and demand rates will not affect the overall productivity of an industrial operation.

By way of further background, for example, the can manufacturing industry is one wherein high quality products, and product components, must be routinely manufactured at incredibly high rates while maintaining exceptionally high quality. It is not now unknown for the shells from which complete can ends are made, to be manufactured in a single press at rates of up to 3,500 shells per minute from a single die press. Machines are now being built wherein the manufacturing rate from a single machine having two sets of dies will produce 5,200 shells per minute, and still further improved machines are in prospect which will produce up to 7,000 or more shells per minute. Multiple machines, of course, add to the manufacturing speed potential in this and other industries.

As is typical with many modern industrial operations, the overall manufacturing operation is subdivided into a plurality of individual component-making steps, and each of these steps is further subdivided into a sequence of further individual steps. As the cyclic rates of manufacturing machines increases, the importance of flexibility in manufacturing becomes apparent.

Quite clearly, only brief dislocations with machinery downstream of manufacturing machines operating at these speeds could either cause excess "stack-up" of parts forced to be arrayed and transiently stored before difficulties or delays in the downstream machines has been accomplished. Often, the upstream machines are simply stopped because transient storage has been impractical. By the same token, if a very high speed upstream machine is to be stopped briefly for machine repair or inspection, it is almost always still desirable to maintain continuous operation of machines downstream of such inactivated machine. This requires that articles be available from storage, since the articles are not then being manufactured. Effective workload regulation is likewise desirable under these circumstances.

Referring specifically to one application of the workload regulator of the present invention, manufacturing can ends in the beer and beverage industry is subdivided into a shell press operation wherein feedstock, usually in coil form, is supplied to a press which, with each stroke, produces a plurality of can ends from coiled sheet stock. These ends are in the form of metal disks to which a substantial third dimension or countersink has been imparted, and to which a so-called curl has also been imparted. These individual can end shells emerge from the shell presses in a plurality of strings, which strings of ends are then fed to a downstream machine such as a so-called end liner. The liner fills the peripheral channel or curl in the can end with a plastisol or like gasket-forming material which is necessary to form a fluid-and gas-tight seal between the end and the can body when the two are Beamed together after the can has been filled.

In one form, after end shells are stamped or drawn and curled, and after they have been aligned, the can ends thus formed are fed to so-called conversion presses wherein an easy-opening feature is imparted to the can end by scoring a tear-out area and affixing a pull tab to it. The conversion presses are customarily fed a supply of can ends and a continuous roll of aluminum tab sheet stock material. Easy-opening ends thus formed are then stored on site or transferred to the can filling site.

With can making equipment being operated at such phenomenal speeds, it is considered ideal to have the operating speeds of the machines and the numbers of such machines carefully matched so as to avoid transient over-or under-capacity during manufacturing. However, this idea is rarely able to be maintained in practice, for reasons of maintenance requirements, unforeseen breakdowns, changes in scheduling, or the like. If these events occur, as they often do, it is still desired to maintain the projected manufacturing rate in spite of discontinuity and/or dislocation.

Even when a relatively minor breakdown occurs, for example, in one area of the manufacturing operation, this in turn may necessitate undesirable alternatives of ceasing manufacturing, or being required to accommodate temporary over-capacity by storing a partially manufactured products this action itself creates its own set of problems, namely, that of attending to quality control in an interrupted manufacturing operation.

At present, the possibility of manufacturing dislocations with presently known high speed machines is such that can end manufacturing is customarily accommodated by non-automated feeding and transfer between machines.

According to the present invention, steps previously performed by hand are able to be accomplished in a fully or partially automated manufacturing operation, with the potential of dramatic cost savings and increased production being achieved with an actual increase in product quality.

In view of the failure of the prior art to provide effective methods and apparatus for the regulating or balancing the output of plural mass production machines with the handling capacity of machines located downstream or downline thereof, it is an object of the present invention to provide an improved workload regulator for industrial operations.

Another object of the invention is to provide a workload balancer or regulator to be used in the can making industry.

Yet another object of the present invention is to provide an apparatus for handling mass produced high quality products such as can ends, and, in particular, to receive continually manufactured quantities of such products from plural sources, and to transiently array them in groups and place the groups in temporary storage, while simultaneously transferring other of such products directly to a downstream work station, with inflow and outflow being controlled so as to balance or regulate differing rates of article production or supply, and demand or capacity.

A further object of the invention is to provide apparatus for handling mass produced parts such as can ends and which includes a plurality of stations, including an acculation station for receiving plural, substantially continuous inputs or "strings" of can ends, an inbound staging area at which the strings are subdivided into individual arrays or "sticks", an apparatus for transferring such sticks of can ends into any one of a plurality of tracks in an outbound staging areas, or in the alternative, to a storage position, and wherein the subdivision into sticks, storage of incoming sticks and feeding and/or supplementing of outgoing sticks is accomplished as a part of a single, ongoing process.

Another object of the invention is to provide an apparatus which is capable of storing plural arrays or sticks of articles such as can ends, and continually adding to or taking from the stored quantity of such articles, as indicated by the quantity of articles being fed to the apparatus on the one hand and being accommodated by machines downline of the apparatus on the other hand.

Yet another object of the invention is to provide an apparatus for handling can ends or the like which includes means for receiving plural strings of can ends from individual shell-forming machines, means for subdividing a plurality of such strings of ends into individual sticks, means for temporarily storing such sticks while additional strings of ends are being fed to the apparatus, and means for repositioning such sticks of ends, in the alternative, into an outbound staging area, into an inventory build-up area, as well as transfer means for individual sticks from a previously established storage or built-up inventory area.

A still further object of the invention is to provide a workload regulator which includes a number of storage containers, storage areas within each of the containers for accommodating a plurality of products arrayed in individual groups, a magazine for accommodating a plurality of containers filled with articles, and a magazine for accommodating a plurality of empty containers, and which further includes means for positioning one container being filled or emptied to a succession of positions within a transfer station area, so that the containers may serve as a variable-capacity transient storage area for the purpose of balancing inbound and outbound quantities of such products.

Yet another object of the invention is to provide a workload regulating apparatus which includes plural work stations adapted to handle, respectively, trays or like containers of products, being filled with such products, trays from which said products are being emptied, means for subdividing incoming products into individual arrays, and means for removing such arrays of outgoing products with a control apparatus being provided for determining the incoming supply rate and the outgoing demand rate, and for selectively positioning incoming arrays of articles so they may be placed directly into an outbound staging area or stored transiently so as to accomplish the objective of regulating the flow rate of the articles between work stations without slowing down the production rate of such stations.

A still further object of the invention is to provide a workload balancer which is adapted to remove arrays of individual products from storage and advance them to work stations downline of the apparatus from an inventory of such materials, even when the apparatus is not receiving freshly manufactured products so as to continue to supply products downline of the apparatus during a cessation of upline manufacturing.

Yet another object of the invention is to provide an apparatus of the type just described which further includes means for moving additional articles to more permanent storage areas and removal from such more permanent storage areas, whether or not such storage areas serve as a portion of the regulating or balancing apparatus.

A yet further object of the invention is to provide a system for regulation of the supply and demand for component parts in an industrial process which includes at least one storage container with a plurality of storage areas, including means for adding groups of articles to, and taking them from, the storage areas, and means for moving the container in either direction relative to a storage and retrieval area at which such parts are added to and taken from storage, together with a control system which moves the container in both directions so as to provide a supply of groups of articles to be taken from storage when needed and to provide a container for transiently storing articles when required.

Another object of the invention is to provide a load regulator for an industrial process wherein a continuous stream of articles may be subdivided into groups for handling, and to which apparatus includes two magazines each adapted to receive a plurality of storage trays received within the magazines, and a conveyor for transporting a container from the first magazine to the second magazine, and from the second magazine back to the first, with one magazine being adapted to receive full trays, the other magazine adapted to receive empty trays, and the conveyor being adapted to move a container which is being filled or being emptied between a plurality of positions to facilitate groupwise additions to or retrievals from the carrier, in combination with a control which moves the container toward the full container magazine when article groups are being added to the container, and for moving the container toward the empty container magazine while article groups are being taken from the container.

Another object of the invention is to provide a method for balancing the work flow of a supply of articles created by machines and being fed in a continuous array toward a production line destination which includes removing inbound articles in groups from an inbound lane area and transferring them to an outbound lane area, determining when the number of articles called for by the production line destination is less than the number of articles being received from the source, periodically removing groups of articles from the inbound area and placing them in trays for transient storage, and when the number of articles called for by the destination exceeds the number being received from the production source, supplementing the supply of articles being fed from the inbound lane areas to the outbound lane areas by removing additional articles from storage and adding them to the articles being transferred directly from the inbound lane to the outbound lane.

Still another object of the invention is to provide a method as described above which further includes periodically placing trays filled with the articles in a filled tray storage area, and periodically removing the empty trays to an empty tray storage area, so as to provide at least one individual tray receiving or providing groups of articles, and full and empty trays to provide respectively additional stored articles and storage capacity.

A further object of the invention is to provide a method of balancing the rate at which articles being supplied from a first, upstream work station with the demand for such articles at a second, downstream work station, which method includes providing at least one inbound staging area for receiving the articles from the first work station, and an outbound staging area for advancing articles to the second, downstream work station, and continually removing the articles in groups from said inbound staging area and transferring them to the outbound staging area, and when the number of articles called for by the second work station is less than the number of articles being received at the inbound staging area, periodically removing groups of articles from the inbound staging area and placing them in selected areas of storage containers for transient storage, and when the number of articles called for by the second work station exceeds the number of articles being received from the first work station, removing the articles in groups from the storage areas of the containers and adding such groups of articles from time to time to the groups of articles already being transferred directly from the inbound staging area to the outbound staging area.

The foregoing and other objects and advantages of the invention are achieved in practice by providing an apparatus which includes means for receiving a continual supply of manufactured articles, transiently arraying the articles in groups and transferring them from an inbound staging area in which they are arrayed to an outbound staging area for movement downstream of the apparatus, which apparatus may also transiently place some or all of the inbound groups of articles in temporary storage, instead of transferring them to the outbound staging area, and which may remove groups of articles from the storage area to supply them to the outbound staging area as a supplement to the groups of articles being directly supplied to the outbound staging area.

The apparatus also includes mechanisms for arraying, loading, and storing both empty and full containers for groups of products, including means providing bi-directional movement of the storage containers to permit the rate at which articles are placed in or removed from storage to be changed from time to time.

The objects and advantages of the invention are also achieved by providing a method of regulating the rate at which articles being supplied from a first work station are advanced to a second work station, which includes receiving inbound articles in a staging area and advancing at least some of them to an outbound staging area, as well as transferring groups of inbound articles to transient storage areas instead of to the outbound area and, in the alternative, supplementing the supply of outbound articles by adding groups of articles taken from the storage area to the outbound groups.

The manner in which the foregoing objects and advantages are achieved in practice will more clearly be apparent when reference is made to the following detailed description of the preferred embodiments of the invention wherein like reference numbers indicate correspondence of the drawings.

BRIEF DESCRIPTION OF THE DRAWINGS

FIG. 4 is a side view, partly in elevation and partly in section, showing the article accumulator, the article staging areas, a conveyor, and article transfer assembly forming parts of the present invention;

FIG. 5 is a fragmentary elevational view of the article transfer assembly of FIG. 4;

FIG. 6 is a front elevational view of the apparatus of FIGS. 2–4;

FIG. 7 is a fragmentary vertical sectional view, taken on an enlarged scale, and showing portions of the container and the article transport assembly used to deposit and retrieve groups of articles therein;

FIG. 8 is a top plan view of the workload regulator apparatus of FIGS. 2–4;

FIG. 12 is a block diagram showing operation of the workload regulator system.

DESCRIPTION OF THE PREFERRED
EMBODIMENTS OF THE INVENTION

While it will be understood that the apparatus of the invention is capable of use in a number of environments and has application in many industries, and while it will be further understood that the apparatus of the invention may have its elements arranged in a variety of ways, a description of the invention will be given with respect to a form of apparatus used to receive and transiently store can ends and elements thereof during the process of manufacture. For this purpose, a generalized discussion of one application of one form of the apparatus will be given, following which one basic form of apparatus embodying the invention will be described in detail.

Figure 1:
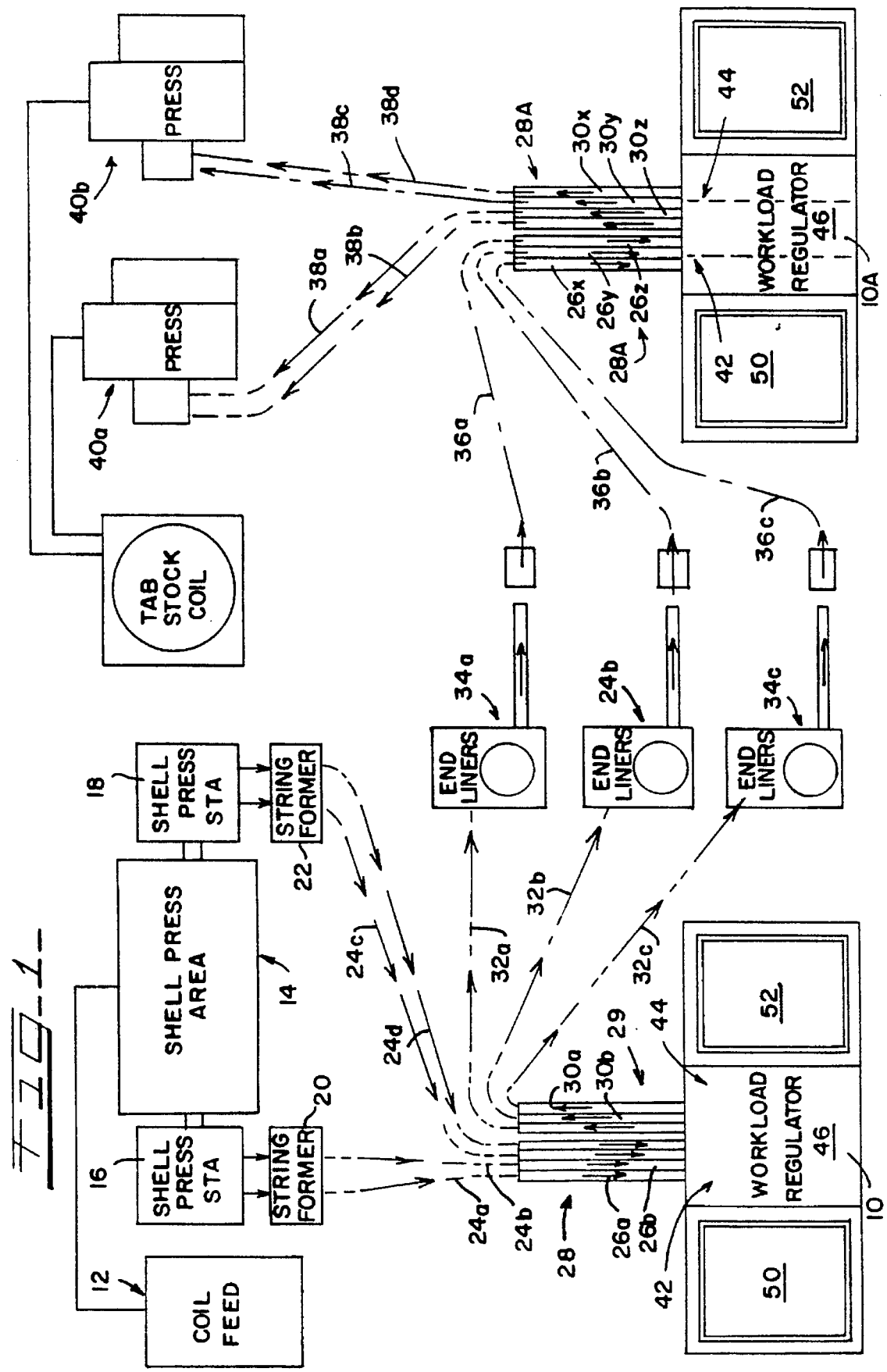
Fig. 1 is a top plan view, schematic in nature, showing the use of the so-called workload regulator of the invention in use in a can manufacturing operation wherein the articles being produced are so-called easy opening can ends.

Referring now to FIG. 1, a schematic view of a manufacturing operation is shown wherein first and second workload regulators, 10,10A are shown in place within a manufacturing operation. As reflected in FIG. 1, a coil of suitably gauged metal stock is shown schematically to be advanced from a coil feed station generally designated 12 to a so-called shell press area generally designated 14, and shown to include first and second shell press stations 16,18. Each station 16,18 is operatively associated with so-called string formers 20,22, whose purpose is to array the output of the shells formed in the press 14 into a continuous "string" within a conveyor along whose length the shells are fed.

As used herein, a "string" refers to a continuous array of shells or like parts which are not yet subdivided or grouped, and a "stick" refers to a subdivided group of parts. Each of these conveyors, schematically represented by lines 24a, 24b, 24c, and 24d, is referred to as an "infeed conveyor".

These infeed conveyors 24a, 24b, etc., have their upstream ends situated at the output of the string former portions 20,22 of the shell press stations 16,18 and their downstream ends adjacent to and communicating with individual infeed lanes 26a and 26b, etc., in an inbound accumulator assembly generally designated 28 and shown to form one part of the workload regulator 10.

Opposite the accumulator assembly 28 is a consolidator assembly generally designated 29 and shown to comprise a plurality of individual outbound lanes 30a, 30b, etc. The downstream ends of the outbound lanes 20a, 30b, etc, meet at the upstream ends of the outbound article conveyors shown schematically as 32a, 32b, 32c which in turn have their downstream ends feeding so-called end liners generally designated 34a, 34b, 34c, respectively. Substantially continuous arrays or strings of articles are then in turn fed from the end liners 34a, 34b, 34c to their respectively associated conveyors 36a, 36b, 36c, whose upstream ends receive lined ends and transmit them to the inbound lanes 26x, 26y, 26z of the accumulator 28A portion of the workload regulator 10A. This regulator 10A also includes a consolidator area 29A at which individual can ends or like articles are fed along a plurality of channels 30x, 30y, 30z before being fed along conveyors 38a, 38b to tabbing presses 40a and along their conveyors 38c, 38d to another tabbing press 40b.

Figure 2:
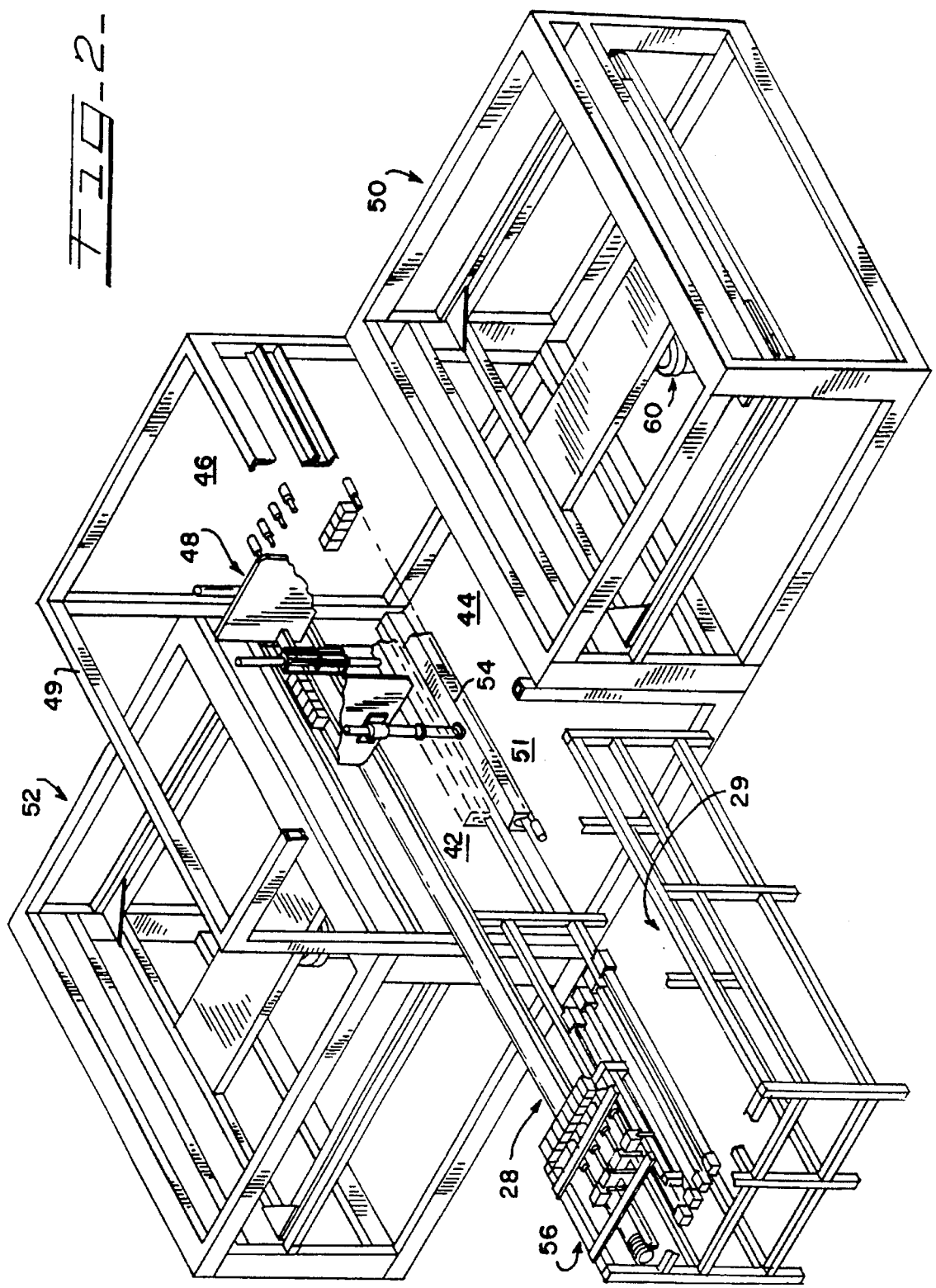
FIG. 2 is a perspective view, with portions broken away, showing certain major elements of the workload regulator apparatus of the invention.
Figure 3:
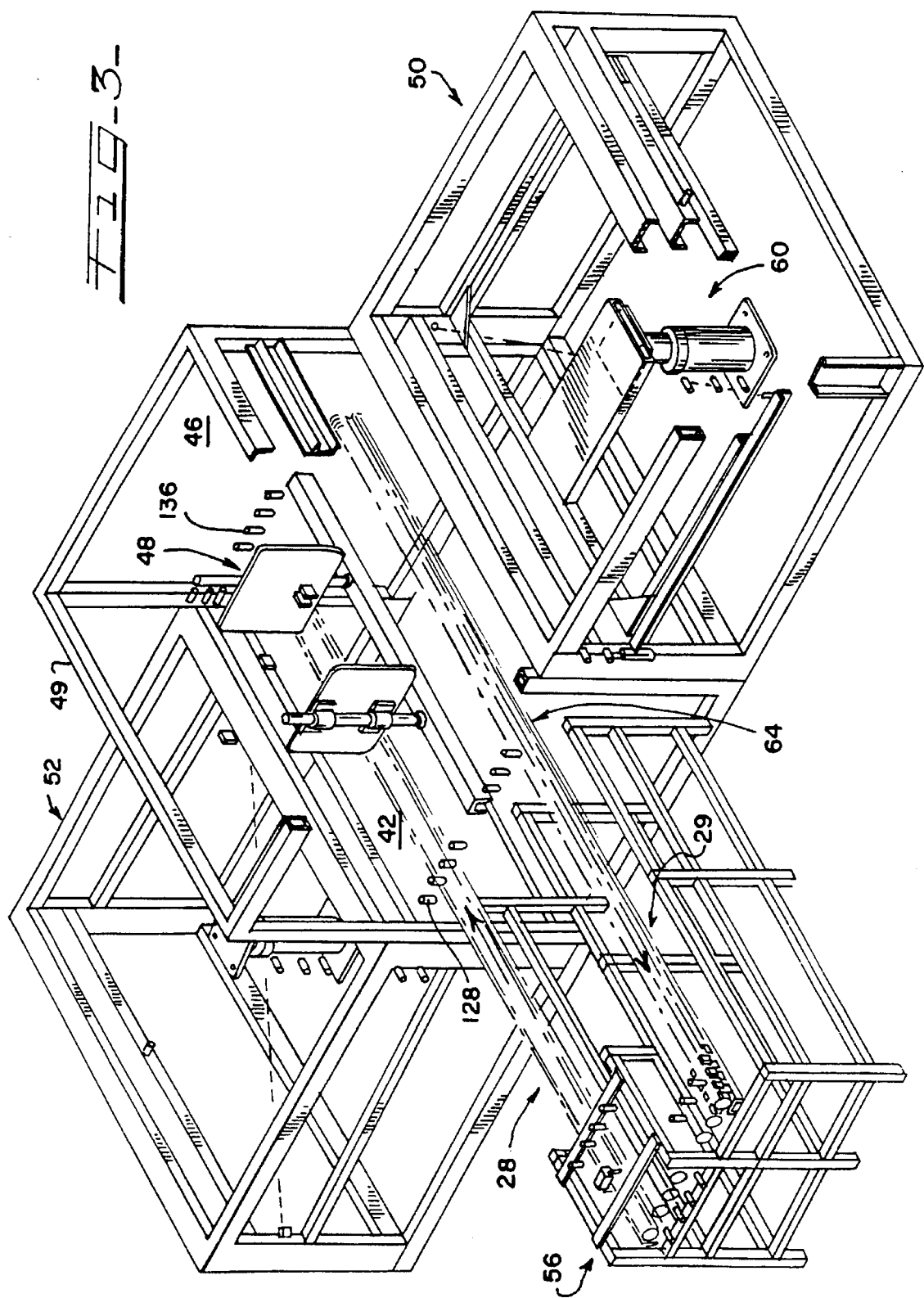
FIG. 3 is a view similar to that of FIG. 2, and additionally showing the provision of certain sensor elements used in the control system of the apparatus.

Referring again to the regulator 10, both this apparatus and its counterpart 10A also include inbound staging areas schematically generally designated 42, outbound staging areas generally designated 44, and a central article transfer station 46 at which is positioned a transfer apparatus (generally designated 48 in FIGS. 2 and 3.) FIG. 1 also shows that the regulator 10 includes magazines 50, 52 for empty and full containers respectively of shells or like products being made from time to time.

From the foregoing explanation it will be seen that one general object of the invention is to provide apparatus and methods for insuring that the various work stations may be operated at their full instantaneous production capacities without creating supply or demand problems at the individual work stations. This is done, in simplest terms, by determining the respective rates of supply and demand for the articles, and transiently placing in storage, or taking from storage, groups of articles sufficient to supplement or diminish the rate at which articles passing through the load regulators would be supplied directly from the inbound to the outbound lanes or staging areas. If supply and demand are evenly balanced, articles are transferred in groups from the staging areas fed by the inbound lanes to staging areas adjacent the outbound lanes, without change of the inbound and outbound rate relative to each other. If not, articles are placed in or taken from storage to achieve matching of rates and regulation of workload.

A transfer from inbound to outbound may be thought of, or described as, "direct" even though it may be achieved with one or more intermediate or "idler" steps; by "direct" is therefore meant where the inbound and outbound rates are the same; this normally, but not always means without intervening withdrawal of articles from the inbound areas or addition of articles to the outbound areas.

Referring now to FIGS. 2 and 3, several other principal components of the invention are shown, and these include the transfer apparatus 48 which is movably positionable relative to the framing 49 forming a part of the transfer station 46. The apparatus 10 also includes a magazine 50 for empty trays and a magazine assembly 52 for full trays. The accumulator 28 and the consolidator assemblies 29 are shown to communicate respectively with an inbound staging area 42 and an outbound staging area 44, these areas are shown in greater detail in FIG. 8.

A deposit and retrieval area 51 is shown to lie beneath the lowermost operating position of the head portion 54 of the transfer apparatus 48. FIG. 2 also shows that means in the form of an accelerator/separator generally designated 56 are provided for subdividing a continuous array of can ends or other articles in each inbound lane 26a, for example, into individual groups.

Referring to FIGS. 2 and 3, a hydraulic piston and cylinder type lift unit generally designated 60 is shown to be provided and to form a part of the empty tray magazine 50; a counterpart lift 62 is provided for the full tray magazine 52.

FIG. 3 shows that a consolidator area generally designated 64 is provided for each of the plurality of outbound lanes 30a, 30b, etc. for example this assembly 64 works in the opposite sense as the subdividing assembly 56 insofar as the latter subdivides continuous "strings" of articles into article groups and the consolidator 64 assembles groups back into continuous strings, or permits groups to accumulate into continuous strings, for feeding into the associated conveyor for travel to the downstream work station.

FIGS. 4–7 show additional details of the transfer apparatus 48 which, in one mode, picks up articles from the inbound staging area 42 and deposits them either in a storage container or in the outbound staging area 44, and in another mode picks up articles from a container in the deposit and retrieval area and deposits them in the outbound staging area 44 for passage to the outbound lanes 30a, etc.

More specifically, FIGS. 4–7 show the transfer apparatus 48, the inbound staging area 42, the outbound staging area 44, and the deposit and retrieval area 51. In addition, details are shown of the storage container in the form of individual trays 64, each having storage areas 66 for the can end 68. FIGS. 4 and 6 also show means in the form of a cross feed conveyor generally designated 70 for positioning individual storage trays 64 during loading and unloading. Additional details are also shown of the accelerator/separator 56 and the cross feed tray conveyor generally designated Referring now to FIGS. 4 and 5, the transfer station 46 is shown to include the vertical and horizontal framing members 49 referred to earlier, these being arranged in the generally rectangular form so as to provide an open area for movement of the transfer apparatus 48. The apparatus 48 includes a head portion 54 which may include magnetic elements 80 if the ends or other parts to be handled are of a ferromagnetic material. The head 54 is shown to be supported by opposed mounting brackets 82 depending from support rods 84 housed in tubular guides 86. The piston and cylinder arrangement 88 acts to reciprocate a center support rod 90 having a clevis 92 at its end, at which it is joined to a center support bracket 94. Accordingly, vertical movement of the rod 90 is accomplished under the control of the piston and cylinder assembly 88 whose operation in turn is dictated by controls (not shown) serving to raise or lower the head 54.

As is best shown in FIG. 4, plungers 96 are provided for inserting downward pressure on the array of products held in the elements 80 to remove them mechanically. If the articles are held magnetically, they may be released by a switch (not shown) of a known type.

Movement of the transfer apparatus from side to side is also achieved under the control of a servomotor, here generally designated 98 and shown to be equipped with a drive belt 100 operating a threaded rod 102 which propels the carriage assembly generally designated 53 from side to side, that is, to a position wherein the head 54 overlies either a selected track in the inbound staging area, a track in the outbound staging area, or a channel in a tray in the deposit and retrieval areas 51. In this connection, FIGS. 5 and 8 show the carriage 53 to be supported for horizontal movement by guide ears 104 which embrace transverse support rods 106 extending between frame elements 49 defining the transfer station. Feedback or horizontal control is accomplished through a another servomechanism part, the position indicator, which includes auxiliary belt 110, and a sensing or comparator mechanism 112 a known kind. The connection between the drive or positioning servomotor 98 and the control or position indicator is such that, as is well known in the art, the rod 102, which is preferably of an acme or buttress thread construction, will thus rotate to the degree indicated by the control mechanism and will then slow down and stop precisely at the desired point so as to index the head 54 in the desired position of use. Thus, the transfer mechanism contains vertical and horizontal drive units and appropriate controls permitting it to move about as indicated and to pick up and withdraw arrays of articles received in the staging areas 42,44 or in the deposit area 51.

Referring again to FIG. 4, the accelerator/separator generally designated 56 is shown to include its own framing assembly generally designated 120 and shown to include at least one vertically and horizontally reciprocating blade 122 and blade carrier 124. This arrangement is positioned on slide rails 126 permitting it to reciprocate. In use, the blade 122 is lowered as a string of can ends is fed to an inbound lane 26a in the accumulator area 28. When the lane 26a is nearly filled, as determined by a sensor 128 (FIG. 3), the blade 122 descends into the string of can ends or like articles to separate them. Immediately thereafter, it rapidly moves forward, advancing the stick of ends generally designated 132 in FIG. 4 so as to separate the trailing edge of this stick or group from the leading edge of the following group. The conveyor generally indicated at 134 continues to exert an advancing bias pressure on the group of ends, and insures that this stick, having been separated, is transferred to the inbound staging area 42 and will arrive there within the desired time. As shown in FIG. 3, when its leading edge approaches the sensor 136, a signal will be generated which indicates that this stick is available for handling by the transfer head 48. The conveyor system 72 for advancing the sticks of ends is of conventional construction in the can industry and is of a type which provides a positive, forward-going bias on the stick of can ends but which will not damage or destroy them if they meet with resistance to further movement.

Although not shown in detail, it will be understood that a plurality of incoming arrays of ends, (those in lane 26a, 26b, 26c) may thus be subdivided into individual groups and handled as will appear; three to six incoming lanes are presently preferred for use in the load regulator of the invention, although more may be provided.

Referring now to FIG. 6, several other principal elements of the invention are shown, and the capability of the transfer apparatus 48 to move the pick-up or transfer head 54 to the deposit and retrieval level 51 is shown. FIG. 6 also shows a cross feed conveyor for trays generally designated 70, and serving to move empty and full trays or empty and full trays or storage containers to and from the magazines 50,52.

Referring again to FIG. 6, and in particular to the storage magazines 50,52 for full and empty trays, the empty tray magazine 50 is shown to include a magazine frame having vertical frame members 140, horizontal members 142, and tray guides 143.

Frame members 140 includes one or more journals 144 for accommodating a continuous chain 146 having pusher bars 148 thereon and forming a part of the cross feed tray conveyor 70 described in greater detail elsewhere herein.

In FIG. 6, an empty tray 64 is shown resting on the conveyor 70 just referred to. FIG. 6 also shows an operating rod 150 forming a connector between a first drive sector 152 and a second drive sector 154, which elements combine to comprise a bell crank operable by a piston and cylinder assembly 156, which in turn drives the container or tray support mechanism to be described in detail.

From FIG. 6, it can be seen that the tray support piston and cylinder assembly is fixed to one of the vertical frame members 140, and that a clevis 158 affixed to a part of the sector 152 provides the sector connection. When the clevis 158 is raised, the sector 152 rotates about the axis of the drive shaft 160. This causes the operating rod 150 to draw the right hand or driven sector 154 in a clockwise direction and rotate the lefthand drive shaft 162. Each shaft 160,162 is associated with a pinion gear 163 (see also FIGS. 9 and 10), the function of which is described in greater detail herein.

Each magazine 50,52 has an associated tray lift 60,60a. The lift unit 60 includes a piston and cylinder arrangement 164 operating a tray support frame 166 which engages a tray 64 when raised into a position of contact therewith. The piston and cylinder assembly 164 permits the support frame 166 to be raised at least to and slightly above the level of the drive shaft 162 of the tray support mechanisms.

FIG. 6 also shows that magazine 52 has a similar lift 60a having a piston and cylinder assembly 164a and a support frame 166a forming a part thereof. FIG. 6 shows that the full tray magazine assembly 52 is the same as that of its counterpart 50, except that the tray 64 has a plurality of ends or other articles disposed therein. FIG. 6 also shows that magazine 52 has a journaling bearing 144a for the left end of the cross feed tray conveyor. Reciprocable container supports 168 operated by racks 170 and in turn driven by the pinion gears 160, provide for reciprocating movement of the support elements 168 into add out of supporting relation with the lower surfaces of the tray 64, as will be described in detail later.

Referring again to the cross feed tray conveyor, a pair of idler rollers 172, 174 are shown to be provided, as is a drive sprocket 176 operated by an electric motor and gear drive 178. This chain type conveyor is conventional in all respects, and is driven intermittently between a plurality of positions under the control of an indexing mechanism or otherwise as is known in the art. Each increment of cross feed conveyor movement serves to position the tray 64 so that its channels 65a,65b register with the movement axis of the vertically reciprocable head 54 on the transfer mechanism 48.

In use of the apparatus 10, one tray 64 may be in the process of being removed from a stack of counterpart empty trays and placed on the cross feed conveyor as shown, while another, full tray is being added to the stack of full trays in the magazines 52.

Referring to depositing an empty tray 64 on the conveyor 70, the lift 60 bearing the tray deposits it by being moved to a withdrawn position. The tray situated in the transfer area 61, it may be assumed, is traveling to the left as shown in FIG. 6 and is nearly full. The previously supplied full tray 64 shown resting on the conveyors 70 in the full tray magazine area 52 is about to be raised by the lift 62 and can be added to the stack of trays from the bottom in the full tray magazine 52.

For this purpose, the tray 64 is lifted until the upper surfaces of its corner pieces 182 engage the lower surfaces on the corner pieces 184 of the tray 64 disposed above it. In this position, the lift 62 is prepared to support the weight of the entire stack of storage containers. Then, the tray support drive mechanism is actuated, the supports 168 are withdrawn horizontally and the entire stack is raised an increments equal to the height of the tray. The drive mechanism is then operated in the reverse or extending mode, and the supports 168 engage the bottom of the lowermost tray 64. Thereupon the lift 62 withdraws to a retracted position and the entire stack is supported until repetition of this cycle, or the reverse cycle. The trays are thus "upstacked" or "downstacked" as indicated.

FIG. 6 somewhat schematically shows, at 186, the provision of various drive elements for the conveyors forming parts of the staging and/or accumulator areas. Since the construction and operation of these conveyors does not form a part of the apparatus which is novel per se, and since their operation is known to those skilled in the art, additional description thereof is believed unnecessary.

Referring again to FIG. 7, the vertically reciprocating action of the head and the manner of depositing the sticks or groups of articles such as the groups of can ends 68, in the channels 65a,65b, etc., is shown.

The reciprocation of the tray from left to right (or vice versa) is indicated by the horizontal arrow.

Figure 9:
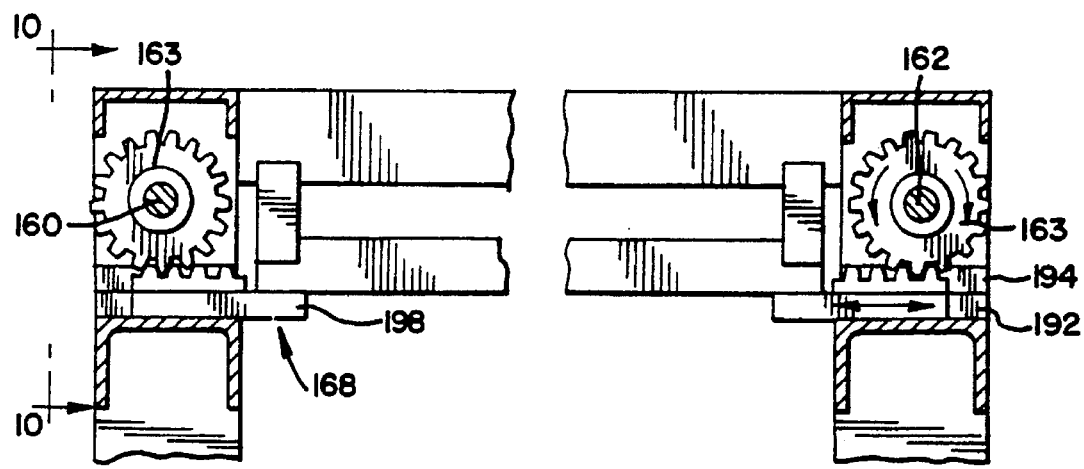
FIG. 9 is an enlarged vertical sectional view, with portions broken away, and showing portions of the container support elements and the support element drive system.
Figure 10:
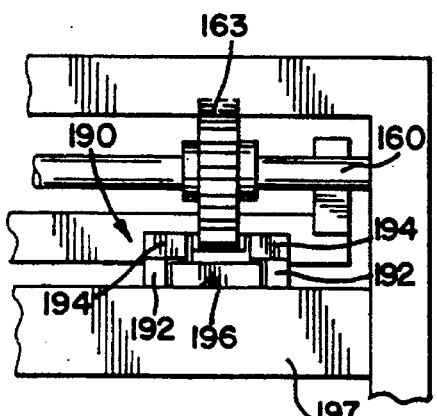
FIG. 10 is a vertical sectional view of the drive mechanism of FIG. 9 taken along lines 10—10 of FIG. 9.

Referring now to FIG. 9, additional details of the container or tray support mechanism are shown. Basically, this mechanism consists of a plurality of the container supports 168 referred to above and shows each of these supports 168 to be journalled within a support channel generally designated 190 and shown to include vertical and horizontal guide track elements 192,194. The supports 168 ride over an upper surface 196 of a frame element 197 and each include a support bar 198, and the rack 170, affixed to or forming a part thereof. The rack 170 is reciprocated by rotation of the drive shafts 160,162, each of which operates under control of its associated sector 152,154 (FIG. 6) which are in turn actuated as described above. The drive mechanism for the tray supports is preferably housed within a grillwork shroud 202 as shown in FIG. 8.

Figure 11:
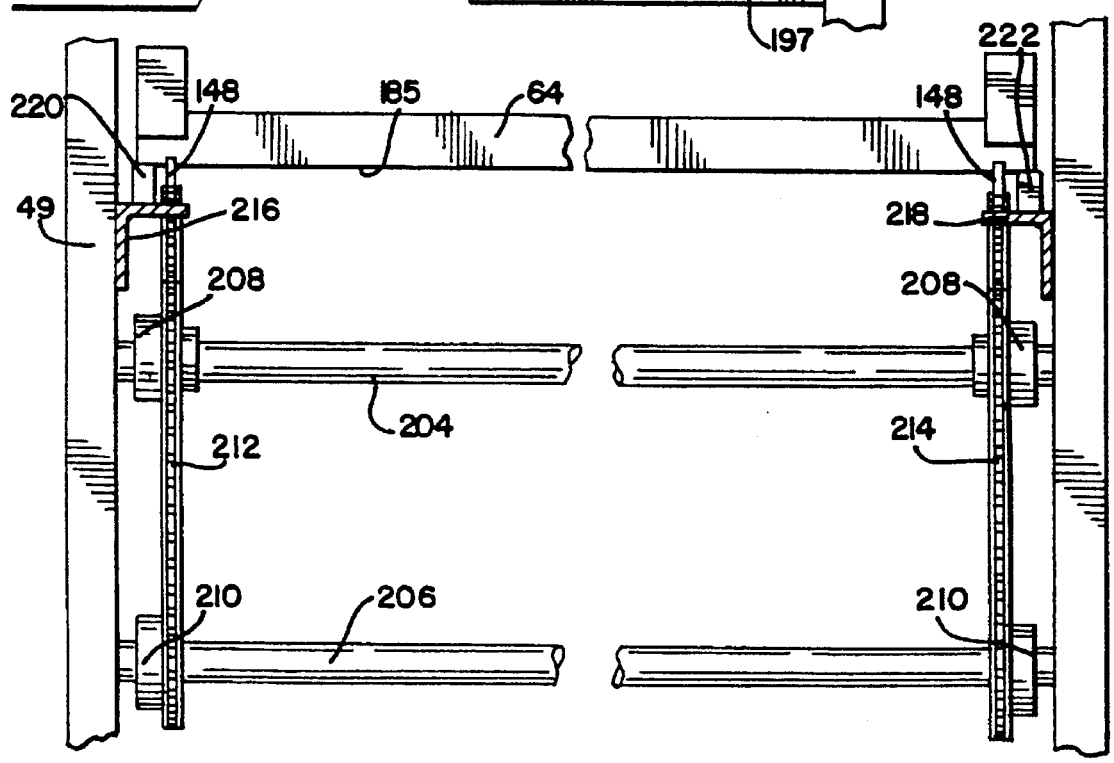
FIG. 11 is an enlarged view, partly in elevation and partly in section, showing certain elements of the container support system and the conveyor for the containers.

Referring now to FIG. 11, certain details of the cross feed or tray conveyor 70 are shown. Here, a plurality of shafts 204,206 are shown to carry drive sprockets 208,210 over which are trained conveyor chains 146. The framing members 49,140 support brackets 216,218 on which a plurality of tray rests 220,222 are secured. These tray rests 220,222 engage the undersides 185 of the rays 64 and may be made from a block of solid, lubricous plastic material such as a polyethelene or TFE (tetrafluoroethylene) material permitting the tray to slide therealong with minimum friction. The trays are actually advanced by being engaged by the pushers 148, which are in turn affixed to and spaced apart on the conveyor drive chains 146.

The intermittent bi-directional operation of the conveyor drive chain is also accomplished with the aid of proximity sensors or other suitable controls to provide precise indexing and alignment for the motor mechanism 176,178.

Referring again to FIGS. 6 and 8, it will be appreciated that the inbound and outbound staging areas 42,44 are in reality extensions of the tracks 26a, 26b, 30a, 30b, formed by the infeed and outfeed conveyors 24a, 24b, 32a, 32b, etc. Drive systems for these units are known to those skilled in the art, so these elements are shown in representative form only as comprising a mechanism generally designated 224 in FIG. 8. In this connection, FIG. 8 also shows that the separator/accelerator 56 in FIG. 8 lacks a counterpart to act as a consolidator for the support groups of articles in the outbound side of the apparatus. While a mechanism serving to positively accelerate the groups of ends towards previously deposited groups of ends for consolidation in the outbound lanes may be provided, a retarding mechanism (schematically shown as 226 in FIG. 8) may serve the purpose of providing a continuous array of outbound articles where this is believed necessary.

Assuming now that it is desired to place the load regulator apparatus in operation, it will be assumed that all trays 62 are empty and that it is desired to begin operation. At this point, the presses furnishing the supply of can ends are started, and as ends move down their respectively associated plural conveyors and into the accumulator area where they are received on the individual incoming lanes. At start-up, perhaps only one shell press might be operated initially. Inasmuch as it is assumed that all trays are empty and that there are no ends in storage, all incoming ends are transferred from inbound staging to storage. Accordingly, the appropriate signal having indicated that no transfer is to be made to the outbound lanes, an empty tray is removed from the empty tray magazine by cycling the tray feed so as to remove a single tray 64 from the tray support in the empty tray magazine 50 and place it on the cross feed conveyor 70. The tray is thereupon indexed to the station 51 with its first storage area or channel 65a aligned with the head.

Thereafter, as each succeeding array of ends is subdivided, placed in the inbound staging area and picked up, it is transferred at the station 51 into the next open channel 65b, 65c, etc., in the being-filled tray 64. Under this assumption, the cycling just described would continue until a desired number of trays, say four or five, would be filled with ends. Thereupon, it is assumed, the downline machine would be prepared for operation and the apparatus 10 would receive a command to fill the outbound staging area and the consolidation areas so as to feed can ends to the downline apparatus. In this sequence, it is assumed that the supply of ends received from the shell press is continuing. Since there is now a demand in the outbound staging area for a supply of ends, the previously subdivided sticks of ends are taken from the inbound staging area and transferred directly to the outbound staging area, being fed respectively to each of the lanes in the outbound staging area as called for the the downstream machines.

This cycling would continue, with all transfers of article groups or sticks being achieved continually. Assuming for the moment that the input or supply rate exactly equalled the demand rate, direct transfer between staging areas would continue. Assuming for the moment, however, that the demand in the downstream work stations exceeds the instantaneous supply, as would be indicated by a downstream signal sent directly, or by the presence of open areas in the tracks in the consolidation areas, then in addition to the sticks of ends being transferred from the inbound staging area to the outbound staging area, the transfer apparatus 48 would periodically pick up sticks of ends from a channel 65a in a tray 64 in the transfer and deposit area 51. These sticks would be deposited in the appropriate outbound lane in the outbound staging area, to supplement the directly supplied ends. This transfer from storage to the outbound staging area would occur as indicated by the demand on the downstream side. In other words, this cycle could be repeated once every five or ten direct transfer cycles, or otherwise as often as is indicated.

Assuming that the supply of incoming ends were to cease altogether, then the entire outbound staging areas would be supplied with ends taken from storage, and the machine would cycle repeatedly in this mode only. Thus, where there is a deficit in the supply, the demand is filled by direct transfer plus supplementary ends from storage, with the possibility being that anywhere between some and all of the ends could be supplied from storage.

Assuming for the moment, that the supply were in excess of the demand, ends would be placed in storage as indicated; in such instance, every fifth, tenth, twentieth stick could be placed in storage, for example. Of course, upon initial start up, or if the demand became zero as a result of line stoppage for maintenance, access, or the like, then all inbound ends would be placed in storage on a group-by-group basis, as previously indicated.

Accordingly, it will be seen that any amount, including the entire inbound amount of articles could be placed in storage; any outbound amount, including all the outbound articles, could be taken from storage, and any proportion of the outbound articles could be supplied from direct transfer to or from storage, depending upon conditions. The conditions are instantaneously reversible, with the machine operating on a group-by-group basis. In other words, if there were temporary excess of inbound ends, they could be placed in storage and even removed from the same placement into storage on the same or next following cycle. Thus, the response time of the machine is substantially zero.

Referring now to FIG. 12, a schematic representation of the above-described form of machine operation is shown. Here, operations which are optional or intermittently performed are shown in broken lines, while preferred or necessary operations are shown in solid blocks.

Thus, block 300 indicates that a supply of ends is being provided from an upstream machine such as a press, and shows that these ends may be accumulated as shown in block 302. A preferred but technically optional step is shown in block 304, namely, subdividing the strings of ends which have accumulated into groups for batch handling. Block 306 shows inbound staging of ends, i.e., preparing the ends for transfer as indicated in block 308. The transfer may be a direct transfer to outbound staging as shown at line 310, whereby the ends accumulate transiently in the outbound staging area 312. From here the ends may be optionally advanced to a consolidator 314 from which they are fed to a downstream machine having a given demand as represented by block 316.

According to the invention, regulation or control is accomplished in one aspect by decreasing the instantaneous rate at which the net supply of ends is sent to the outbound staging area, and in another aspect by increasing the instantaneous supply rate to the outbound staging area. Line 318 shows that the net supply of ends reaching the outbound staging area is decreased by transient storage of certain groups of ends. Here, a single container schematically designated 320 provides transient storage or retrieval by group. An increase in the net supply rate to outbound staging is accomplished as shown at 322, namely, by retrieving groups of ends from the transient storage area 320 and using these groups to supplement the groups of ends being furnished directly from inbound to outbound staging areas from time to time. Block 323 and flow lines 324 and 326 show, respectively, storage or retrieval by container, i.e., adding ends to storage or retrieving ends from storage in full trays, i.e., upstacking or downstacking full trays. Step 326 shows upstacking or downstacking empty trays to add to or withdraw from the reserve tray or storage container capacity of the apparatus.

Control unit 328 is shown as detecting excess supply, line 330, thereby enabling or activating the condition shown at line 318, to decrease the net supply of article to output; where the demand is in excess of the supply as shown at 332, the condition in line 322 is enabled or activated, and the supply is supplemented.

The most essential steps are, therefore, inbound and outbound staging, transfer and storage, and retrieval by group under the control of the condition detector. Storage by container adds flexibility, while the accumulation and subdivision of ends, as well as consolidating ends may be considered optional in the sense that the machine need not itself include these elements to incorporate the invention.

Referring now to certain individual features, the machine logic is of a kind known to those skilled in the art, with various disabling and enabling controls being provided as indicated. Thus, in order for a pick up to be made from an inbound staging area, the lane must be entirely filled as indicated by an appropriate trailing edge sensor which would require a positive-going signal from a leading edge sensor, for example. The transfer to and taking from storage involves a complete stick, and inasmuch as the ends or other articles are loaded into the tray in individual sticks, there is no need for gauging the stick lengths during each cycle.

Referring now to movement of the head portion of the transfer apparatus, the cycle time of this apparatus must be at least as many times faster than the fill-up time of individual infeed area as there are separate infeed lanes. Thus, if there are four infeed lanes, each requiring twenty seconds to be filled, the machine should be able to engage, remove, and deposit a stick in less than five seconds, so that the maximum input capacity of the apparatus could be accommodated. By the same token, the number of transfer cycles able to be achieved by the head is the limiting factor of supply rate to the outbound lanes. The proximity or position sensors referred to may be of the photoelectric, magnetic, or other known type including those operating on infrared or visible light, utilizing the "Hall" effect, or otherwise as known to those skilled in the art.

A detailed description of the invention has been given, with regard to an embodiment wherein a single transfer head is used; it will be understood that two or more such transfer heads may be used where indicated. The articles being manufactured are identified as can ends, but it will be appreciated that any kind of arrayable, mass produced articles which are subject to transfer between work stations, including assembly stations, are adapted for handling by the apparatus of the invention. These include metal and plastic parts of all kinds. The principles of the invention are applicable to balancing or regulating any type of work loads.

Machines incorporating the present invention have been constructed, operated, and sold with great success; in the can industry, these machines are identified by the trademark "BALANCER", owned by the assignee of the present invention.

The invention is not limited to chain type conveyors, since hydraulic or other positioners may be used. A tray magazine with a vertical feed has been shown, but inverting or folding type stackers may be used, and containers other than trays may be used. Similarly, the storage capacity might be accommodated on, or form an integral part of, a conveyor or a single reciprocable container. Other mechanical variations of the apparatus will suggest themselves to those skilled in the art of industrial process machinery. Sensing and leveling mechanisms and detectors may be of any known kind, and the program sequence may be as indicated by the designer.

Indexing has been described as movement between adjacent channels in the trays, but alternate or predesignated storage areas may be selected instead of adjacent areas only. The apparatus may also be integrated with apparatus intended to add additional components to the line, if desired. In other words, more than one style of article may be handled in the machine, and articles may be prearrayed or assembled into groups or subgroups before being handled as a subdivided group by the apparatus. The unit may be constructed so as to include the infeed and outfeed conveyors or merely so as to be able to be interfaced with them. The method of the invention may be carried out by other types of apparatus as well.

It will thus be seen that this invention provide a novel workload regulator for automated production having a number of advantages and characteristics including those pointed herein and others which are inherent in the invention. A preferred embodiment having been described by way of example it is anticipated that modifications may De made to the described form of apparatus and methods without departing from the spirit of the invention or the scope of the appended claims.

We claim:

1. In an industrial process, the method of balancing first rate at which articles are being supplied from a first, upstream work station with a second rate at which such articles are in demand at a second, downstream work station, said method including providing at least one inbound staging area for receiving said articles from said first work station, and an outbound staging area for advancing articles to said second, downstream work station, said method including successively removing said articles in groups from said inbound staging area and transferring said groups of articles to said outbound staging area without substantial change in said first and second rates at which said articles are received and advanced, respectively, said method further including determining when an amount of articles called for by said second work station is less than an amount of articles being received at said inbound staging area, thereupon removing some of the groups of articles arriving at said inbound staging area from said inbound staging area from time to time, and placing such groups of articles in transient storage, and when the second rate at which said articles are called for to be used by said second work station exceeds the first rate at which said articles are being received at said work station, removing articles in groups from transient storage and placing such groups of articles at said outbound staging area.

2. A method for automatically regulating a flow of articles between a first work station, whereat a string of articles is produced at a first variable cyclic operating rate, and a second downstream work station, whereat an operation is performed on said string of produced articles at a second variable, cyclic operating rate, such that at least one of said work stations may continue in uninterrupted operation and at a desired operating rate when said rate of operation of the other work station is temporarily varied, said method comprising:

providing an inbound staging area whereat a plurality of pre-formed groups of said produced articles are temporarily accumulated prior to transfer, said inbound staging area including a plurality of inbound lanes, each inbound lane being adapted to receive a succession of said groups, providing an outbound staging area whereat a plurality of groups of produced articles are temporarily accumulated prior to advancement to said second work station, said outbound staging area including a plurality of outbound lanes, each outbound lane being adapted to receive a succession of said groups, providing a transfer station adjacent said inbound staging area and said outbound staging area, said transfer station including a storage area and a storage container in said storage area, providing at least one transfer head at the transfer station, said transfer head including means for gripping and releasing at least one group of articles, said transfer head being independently movable to and from the inbound staging area, the outbound staging area and the storage area, feeding at least one string of articles from said first work station toward said inbound staging area, successively subdividing a leading portion of each string to define a group of articles from a remainder of said string, separating each group thus formed from the remainder of said string by advancing said group to the inbound staging area as the next succeeding group is being formed, continuously determining a cumulative inbound rate equal to a first rate at which successive groups are being advanced into the inbound staging area, using said at least one transfer head to remove at least one group of articles from the inbound staging area, at a pickup rate substantially equal to said first cumulative inbound rate, using said at least one transfer head to transfer groups of articles to an outbound lane in said outbound staging area at a placement rate, withdrawing groups of articles from said outbound staging area by moving each group along an outbound lane to said second downstream work station, said moving step including the step of consolidating successive groups to reform a string of articles in each outbound lane, continuously determining a cumulative outbound demand rate equal to a second rate at which groups of articles must be withdrawn to provide a sufficient supply of articles to maintain a desired rate of operation at said second work station, adjusting the placement rate so that it is substantially equal to said outbound demand rate, and balancing the pickup rate with said placement rate by directing said at least one transfer head to transfer a sufficient number of groups to and from said storage container so that a desired regulated flow is achieved.

* * * * *